United States Patent [19]
Kim

[11] Patent Number: 5,995,476
[45] Date of Patent: Nov. 30, 1999

[54] OPTICAL PICK-UP APPARATUS

[75] Inventor: Joo-youp Kim, Seongnam, Rep. of Korea

[73] Assignee: Samsung Electronics Co., Ltd., Rep. of Korea

[21] Appl. No.: 08/985,706

[22] Filed: Dec. 5, 1997

[30] Foreign Application Priority Data

Dec. 6, 1996 [KR] Rep. of Korea ............ 96-62476

[51] Int. Cl.⁶ .................................................. G11B 7/00
[52] U.S. Cl. ............................................ 369/112; 369/103
[58] Field of Search ..................................... 369/102, 103, 369/106, 109, 110, 112, 116, 120, 121

[56] References Cited

U.S. PATENT DOCUMENTS 5,513,164  4/1996  Tanaka et al. ............................ 369/112

FOREIGN PATENT DOCUMENTS

| 2-139526 | 5/1990 | Japan | G02F 1/35 |
| 2-216629 | 8/1990 | Japan | G11B 7/13 |
| 5-226275 | 9/1993 | Japan | H01L 21/268 |
| 08153336 | 6/1995 | Japan | G11B 7/135 |

Primary Examiner—Paul W. Huber
Attorney, Agent, or Firm—Dilworth & Barrese

[57] ABSTRACT

An optical pick-up apparatus comprising an optical modular device having two light sources for emitting light beams of different power levels, a photo-refractive crystal device disposed on the optical modular device and a recording medium for coupling the powers of the light beams emitted from the two light sources, and an objective lens disposed on the optical path between the photo-refractive crystal device and the recording medium for focusing the light beam emitted from the light sources on the recording medium. The optical modular device is comprised of a substrate, a mount installed on the substrate, first and second light sources installed on opposing sides of the mount, a photo-detector installed on the mount for receiving a light beam which is reflected from a recording medium, a housing having an opening in the upper portion thereof and incorporated on the upper surface of the substrate, an optical path changing unit installed at the opening of the housing for changing the path of an incident light beam.

10 Claims, 2 Drawing Sheets

OPTICAL PICK-UP APPARATUS

BACKGROUND OF THE INVENTION

1. Field of the Invention

The present invention relates to an optical pick-up apparatus for recording and/or reproducing various types of information on an optical recording medium, and more particularly, to an optical pick-up apparatus employing an optical modular device having two light sources of different power levels.

2. Description of the Related Art

Referring to FIG. 1, a conventional holographic pick-up apparatus comprises an optical module 10, integrally formed with a light source 12 for emitting a light beam and a photo-detector 17 for detecting a light beam reflected from an optical recording medium, and objective lens 16 for converging the light beam emitted from the light source 12 onto the optical recording medium 1.

The above-mentioned optical module 10 includes a substrate 2 and a housing 3. The light source 12 is installed at one side of a mount 11 that is installed on the substrate 2 within the housing 3. The photo-detector 17 is installed on the mount 11 and detects error signals and a radio frequency signal as a light beam reflected from the optical recording medium 1. In this example, an edge-emitting laser is employed as the light source 12.

Two light beams are emitted in opposite directions from the light source 12—one light beam is emitted toward the objective lens 16 and the other light beam is emitted toward a monitoring photo-detector 13, which is installed on the substrate 2. The radiant power of the light source 12 is controlled according to the incident light beam on the monitoring photo-detector 13. A hologram element 15 and a grating 14 are fitted into an opening of the housing 3. The hologram element 15 allows an incident light beam from the light source 12 to be transmitted straightforwardly, and diffracts a light beam reflected from the optical recording medium 1 toward the photo-detector 17. The grating 14 diffracts and transmits the incident light beam from the light source 12, resulting in a zeroth order light beam, ±1 st order light beams, and so on. Therefore, it is possible for the photo-detector 17 to detect a tracking error signal using a 3-light beam method.

The conventional optical pick-up apparatus constructed as described above has the advantage of simplifying the structure of the optical pick-up apparatus by employing one optical module and one objective lens 16. On the other hand, since the power levels of the light source 12 required for recording information on the recording medium and reproducing information from the recording medium are different, the conventional optical pick-up apparatus has the disadvantage of having to tune the power level of the light source 12 by employing an appropriate circuit.

SUMMARY OF THE INVENTION

To solve the above problem, it is an objective of the present invention to provide an optical pick-up apparatus having two light sources emitting light beams of different power levels within a housing.

Accordingly, to achieve the above objective, an optical pick-up apparatus is provided comprising a modular device having two light sources for emitting light beams of different power levels, a photo-refractive crystal device disposed on the optical path between the optical modular device and the recording medium for coupling the powers of the light beams emitted from the two light sources, and an objective lens disposed on the optical path between the photo-refractive crystal device and the recording medium for focusing the light beam emitted from the light sources on the recording medium. The modular device is comprised of a substrate, a mount installed on the substrate, first and second light sources installed on opposing sides of the mount, a photo-detector installed on the mount for receiving a light beam which is reflected from a recording medium, a housing having an opening in the upper portion thereof and incorporated on the upper surface of the substrate, and an optical path changing unit installed at the opening of the housing for changing the path of an incident light beam.

Here, the apparatus may further comprise first and second monitoring photo-detectors, which are installed on the upper surface of the substrate to detect radiant powers of light beams emitted from the first and second light sources, respectively.

Further, the optical path changing unit includes first hologram elements provided with first and second patterns which diffract and transmit incident light beams from the first and second light sources, respectively, and second hologram elements installed upon the first hologram elements and provided with third and fourth patterns which diffract and transmit the incident light beams from the objective lens onto the photo-detector.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF PREFERRED EMBODIMENTS

Figure 1:
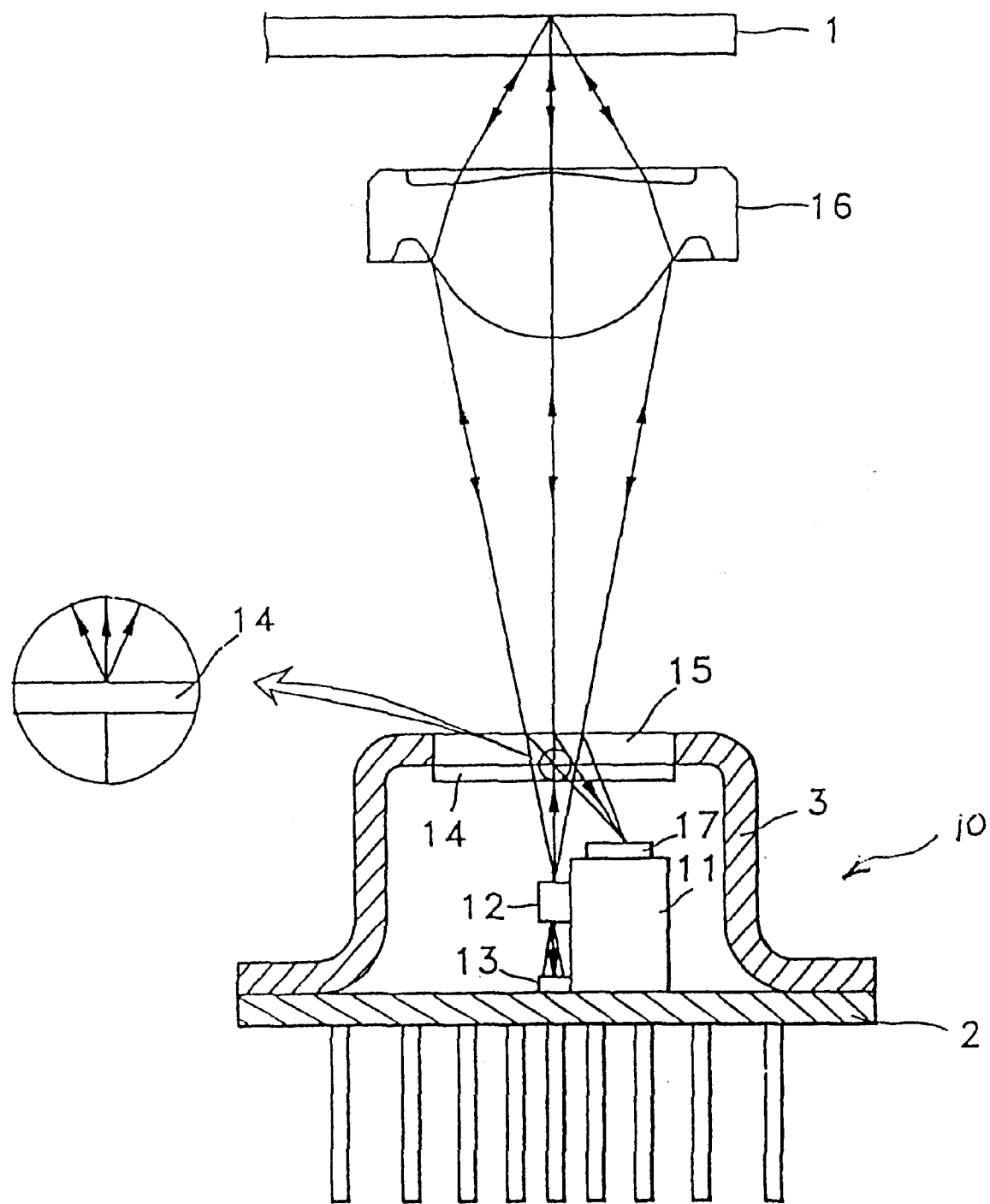
FIG. 1 is a schematic diagram illustrating an optical layout of a conventional optical pick-up apparatus.
Figure 2:
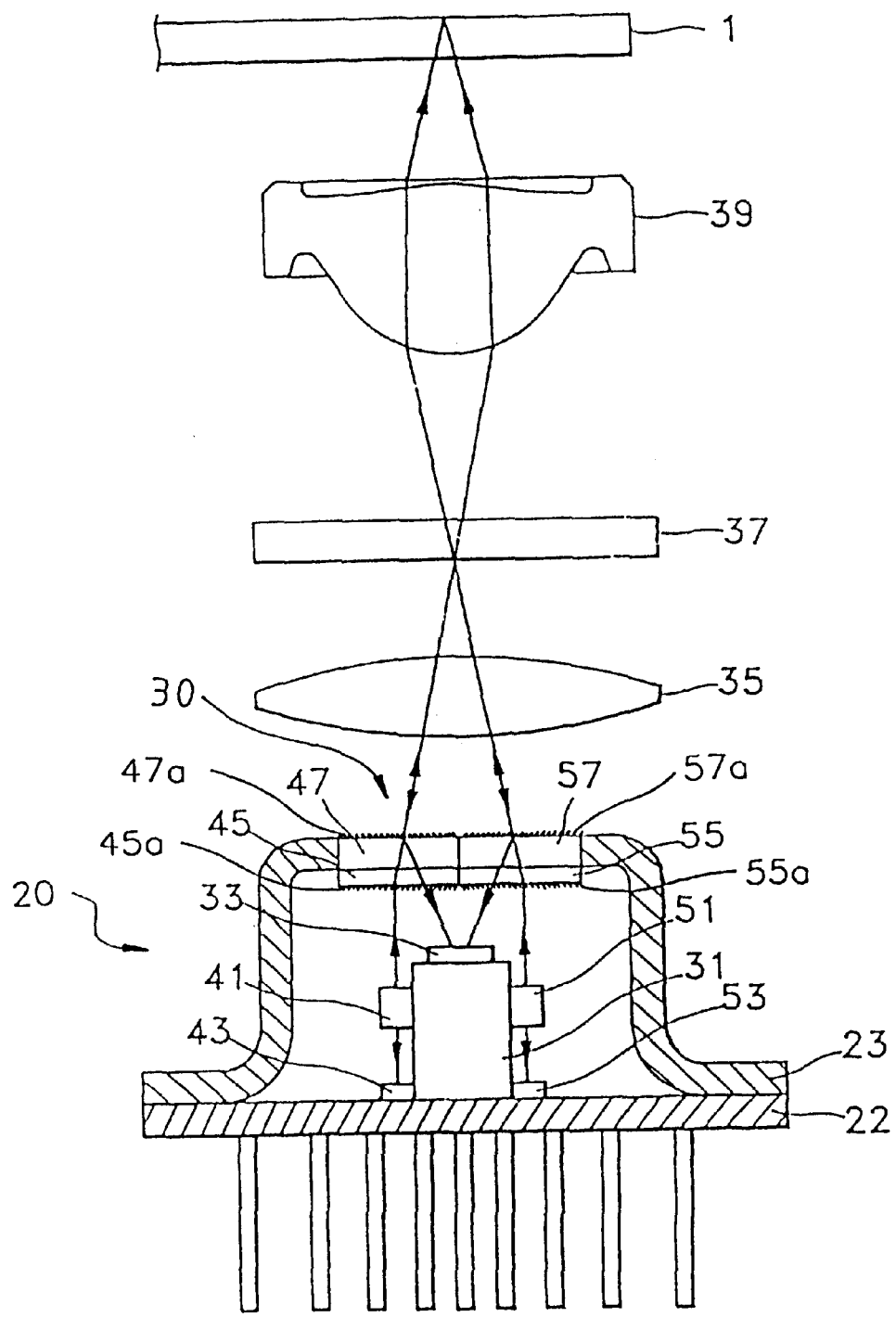
FIG. 2 is a schematic diagram illustrating an optical layout of an embodiment of an optical pick-up apparatus according to the present invention.

Referring to FIG. 2, an embodiment of an optical pick-up apparatus according to the present invention comprises an optical modular device 20 which emits light beams and receives light beams reflected from a recording medium 1, a photo-refractive crystal device 37 for coupling the powers of two incident light beams, and an objective lens 39 disposed on the optical path between the photo-refractive crystal device 37 and the recording medium 1 for converging incident light beams onto the recording medium 1.

The optical modular device 20 includes a substrate 22, and a housing 23 on the upper surface of the substrate 22. A mount 31 is fixed on the substrate 22 within the housing 23, first and second light sources 41 and 51 are installed at opposing sides of the mount 31, and a photo-detector 33 for detecting light beams reflected from the recording medium 1 is installed on the upper surface of the mount 31.

In this embodiment, the first and second light sources 41 and 51 are edge-emitting lasers. Two light beams emitted from the light sources 41 and 51 are directed to the recording medium 1, and two corresponding light beams, are received respectively by first and second monitoring photo-detectors 43 and 53, which are disposed on the substrate 22, and are used respectively for controlling the radiant powers of the light sources 41 and 51.

The radiant powers of the light beams emitted from the first and second light sources 41 and 51 are different from each other. The first light source 41 may be designed to emit a light beam having a radiant power of, for example, 10 mW or 20 mW, and preferably to emit a light beam of any one of the two power levels selectively. The second light source 51 may be designed to emit a light beam having a radiant power of, for example, 5 mW, which is much less than that of the first light source 41.

An optical path changing unit 30 which is fitted into an opening in the upper portion of the housing 23 diffracts and transmits incident light beams from the first and second light sources 41 and 51, and changes the optical paths of the incident light beams reflected from the recording medium 1 toward the photo-detector 33.

The optical path changing unit 30 comprises first hologram elements 45 and 55 and second hologram elements 47 and 57 coupled to the first hologram elements 45 and 55, respectively. The first hologram elements 45 and 55 are respectively provided with first and second patterns 45a and 55a which diffract and transmit the light beams emitted from the first and second light sources 41 and 51 toward the objective lens 39. The second hologram elements 47 and 57 are respectively provided with third and fourth patterns 47a and 57a which diffract and transmit the light beams reflected from the recording medium 1 onto the photo-detector 33.

The photo-refractive crystal device 37 which is a nonlinear device couples the powers of the light beams emitted from the first and second light sources 41 and 51, and directs the light beams to the objective lens 39. The photo-refractive crystal device 37 is formed of a material such as $BaTiO_3$, $Bi_{12}SiO_{20}$, $LiNbO_3$, $KNbO_3$, GaAs and SBN.

Preferably, the present invention further includes a converging lens 35 which is disposed between the optical path changing unit and the pholo-refractive crystal device 37 and converges incident light beams.

The optical pick-up apparatus according to the present invention employs an optical module having two light sources emitting light beams of different power levels and a photo-refractive crystal device to attain light beams of suitable power levels for recording and reproducing operations, and thus a tuning circuit can be omitted to simplify the construction of the apparatus.

Although the illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. An optical pick-up apparatus comprising:
an optical modular device having first and second light sources for emitting light beams of different power levels;
a photo-refractive crystal device disposed on the optical path between said optical modular device and a recording medium for coupling the powers of the light beams emitted from said two light sources; and
an objective lens disposed on the optical path between said photo-refractive crystal device and said recording medium for focusing the light beams emitted from said light sources on said recording medium.

2. The optical pick-up apparatus as claimed in claim 1, wherein said optical modular device comprises:
a substrate;
a mount fixed on said substrate;
said first and second light sources installed on opposing sides of said mount, each emitting a light beam of a predetermined power level;
a photo-detector installed on said mount for receiving a light beam which is reflected from said recording medium;
a housing having an opening in the upper portion thereof; and
an optical path changing unit installed at said opening of the housing for changing the path of an incident light beam.

3. The optical pick-up apparatus as claimed in claim 2, wherein said optical modular device further comprises first and second photo-detectors, which are installed on the upper surface of said substrate to detect radiant powers of light beams emitted from said first and second light sources, respectively.

4. The optical pick-up apparatus as claimed in claim 2, wherein said optical path changing unit comprises:
first hologram elements provided with first and second patterns which diffract and transmit incident light beams from said first and second light sources, respectively; and
second hologram elements installed adjacent said first hologram elements and provided with third and fourth patterns which diffract and transmit incident light beams from said objective lens onto said photo-detector.

5. The optical pick-up apparatus as claimed in claim 2, further comprising a converging lens which is disposed between the optical path changing means and the photo-refractive crystal device and converges incident light beams.

6. The optical pick-up apparatus as claimed in claim 1, wherein the photo-refractive crystal device is formed of a material selected from the group consisting of $BaTiO_3$, $Bi_{12}SiO_{20}$, $LiNbO_3$, $KNbO_3$, GaAs and SBN.

7. The optical pick-up apparatus as claimed in claim 1, wherein the power level of the light beam emitted by the first light source is 10 mW.

8. The optical pick-up apparatus as claimed in claim 1, wherein the power level of the light beam emitted by the first light source is 20 mW.

9. The optical pick-up apparatus as claimed in claim 1, wherein the power level of the light beam emitted by the second light source is 5 mW.

10. An optical pick-up apparatus comprising:
an optical modular device having at least two light sources for emitting light beams of different power levels;
a photo-refractive crystal device disposed on the optical path between said optical modular device and a recording medium for coupling the powers of the light beams emitted from said two light sources; and
an objective lens disposed on the optical path between said photo-refractive crystal device and said recording medium for focusing the light beams emitted from said light sources on said recording medium.

* * * * *